United States Patent [19]

Brower

[11] Patent Number: 5,191,605
[45] Date of Patent: Mar. 2, 1993

[54] TELEPHONE SURGE PROTECTOR

[75] Inventor: Boyd G. Brower, Gorham, Me.

[73] Assignee: GTE Control Devices Incorporated, Standish, Me.

[21] Appl. No.: 705,215

[22] Filed: May 24, 1991

[51] Int. Cl.⁵ .................. H04M 5/00; H04M 1/00; H02H 9/06; H02H 1/00
[52] U.S. Cl. .................. 379/332; 379/412; 379/437; 379/451; 361/119; 361/124
[58] Field of Search ............ 379/332, 441, 412, 451, 379/437; 361/119, 124, 56

[56] References Cited

U.S. PATENT DOCUMENTS

| | | |
|---|---|---|
| 4,800,588 | 1/1989 | Poster, Jr. .................. 379/412 |
| 4,901,188 | 2/1990 | Gilberts .................. 361/124 |
| 4,903,295 | 2/1990 | Shannon et al. .................. 379/437 |
| 4,905,119 | 2/1990 | Webb .................. 379/331 |
| 4,958,254 | 9/1990 | Kidd et al. .................. 361/119 |

Primary Examiner—James L. Dwyer
Assistant Examiner—Fan Tsang
Attorney, Agent, or Firm—James Theodosopoulos

[57] ABSTRACT

A telephone protector comprises an encapsulated bidirectional voltage sensitive switch having three terminals protruding therefrom, one of the terminals being a grounding terminal. There is an elongated shorting bar substantially orthogonal to the three terminals and a metal fusible pellet in direct physical contact with both the grounding terminal and the shorting bar. There is a spring which impels the shorting bar into contact with the other two terminals when the fusible pellet melts.

4 Claims, 2 Drawing Sheets

TELEPHONE SURGE PROTECTOR

BACKGROUND

This invention concerns telephone surge protectors. Such protectors have used carbon gaps and gas tubes to provide protection against voltage surges and have used heat coils to provide against excessive current. Examples thereof are shown in U.S. Pat. No. 4,583,954. This invention is particularly concerned with protectors employing encapsulated bidirectional voltage sensitive switches. Such switches are disclosed in U.S. Pat. Nos. 4,958,254, 4,903,295 and 4,876,713.

SUMMARY OF INVENTION

This invention discloses a telephone protector providing voltage surge protection and excessive current protection in a single unit which can be used, for example, in five pin protectors, such as are disclosed in U.S. Pat. No. 4,958,254, or in network interface devices employing station protector modules, such as are disclosed in U.S. Pat. No. 4,800,588.

A telephone protector in accordance with this invention comprises: (1) an encapsulated bidirectional voltage sensitive switch (BVSS) having three terminals protruding therefrom, one of the terminals being a grounding terminal; (2) an elongated shorting bar substantially orthogonal to the three terminals; (3) a metal fusible pellet in direct physical contact with both the grounding terminal and the shorting bar, the metal fusible pellet acting as a spacer to keep the shorting bar spaced from the other two terminals; and (4) spring means to impel the shorting bar into direct physical contact with the other two terminals when the metal fusible pellet has melted.

Two of the terminals can be connected, for example, to the tip and ring lines of a telephone circuit and the grounding terminal would be connected to ground. A voltage surge at either tip or ring would be shunted by the BVSS to the grounding terminal. Excessive current flow through the grounding terminal could generate enough heat to melt the fusible pellet which, in turn, would activate the shorting bar and ground the tip and ring terminals.

PREFERRED EMBODIMENT

Figure 1:
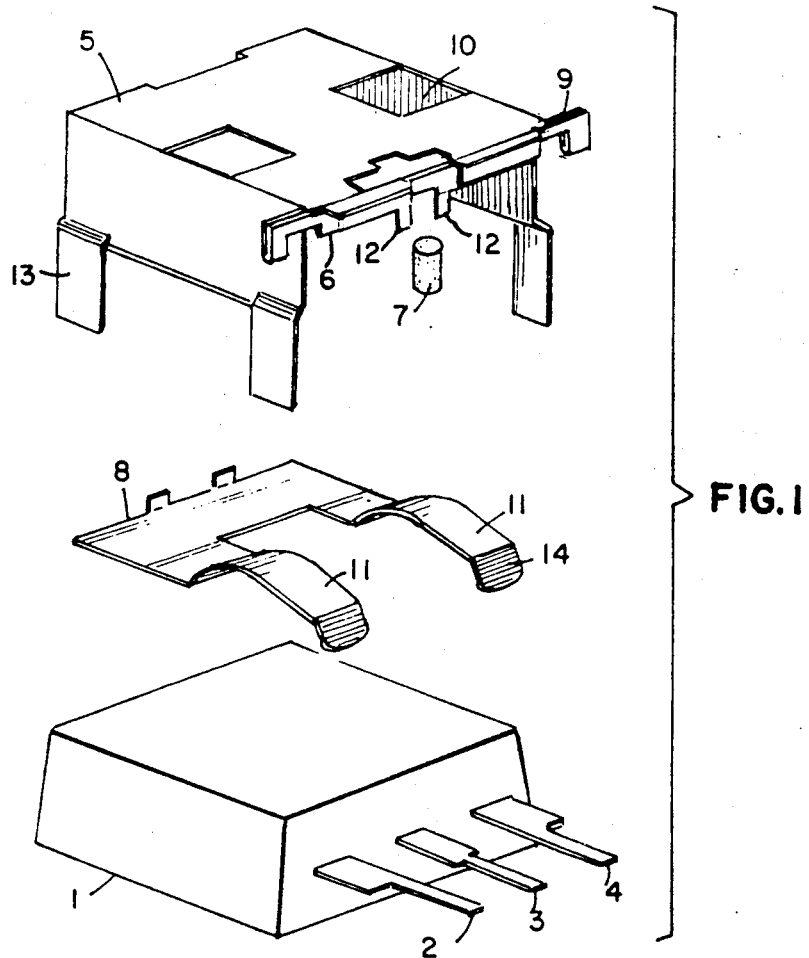
FIG. 1 is an exploded perspective view of one embodiment of a telephone protector in accordance with this invention.
Figure 2:
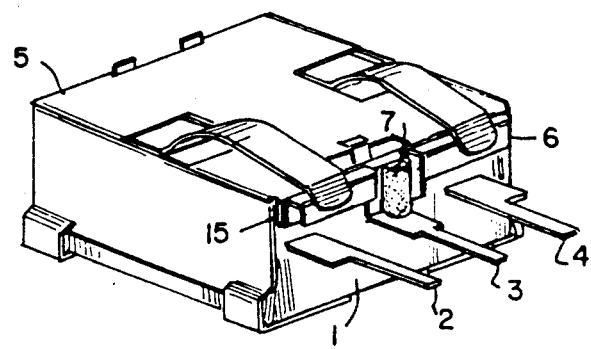
FIG. 2 shows the assembled protector.
Figure 3:
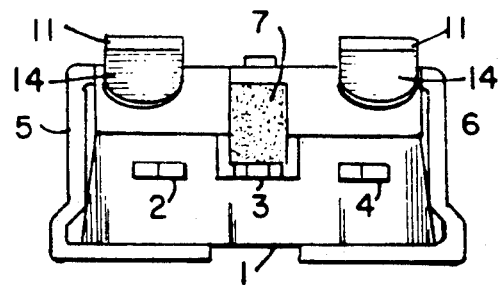
FIG. 3 is an end view and FIG. 4 is a side view.
Figure 4:
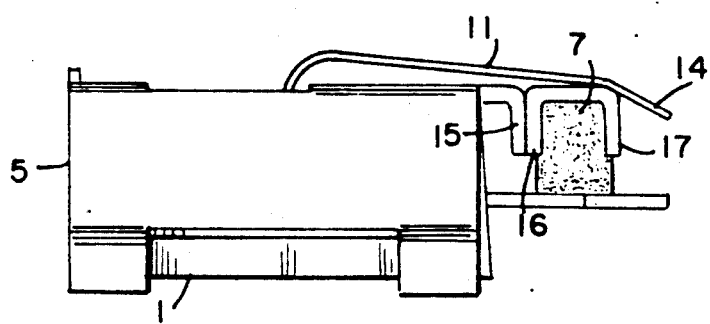

In one embodiment a telephone protector in accordance with this invention comprises a BVSS 1 having terminals 2, 3 and 4 protruding therefrom. Terminal 3 is the grounding terminal. Terminals 2 and 4 are the terminals that would be connected, for example, to the tip and ring lines of a telephone circuit. BVSS 1 is contained within a ground clamp 5 having extensions 13 for clamping around BVSS 1. During assembly, shorting bar 6 is a unitary part of ground clamp 5, being joined thereto by means of legs 9. Disposed between BVSS 1 and ground clamp 5 is a spring 8 having two arms 11. Ground clamp 5 has two openings 10 through which arms 11 protrude. After assembly, legs 9 are cut off, as shown in FIG. 2, to leave shorting bar 6 free floating. Fusible pellet 7 rests on grounding terminal 3 and maintains upward pressure on shorting bar 6 against spring arms 11. In one example, fusible pellet 7 was made of bismuth-lead-tin and had a melting point of 203° F. Shorting bar 6 has two tabs 12 extending down on either side of grounding terminal 3 to prevent sideways movement of shorting bar 6. Spring arms 11 are bent down at forward ends 14 so that the force that spring arms 11 exert on shorting bar 6 is downward and back against forward edge 15 of ground clamp 5.

Figure 5:
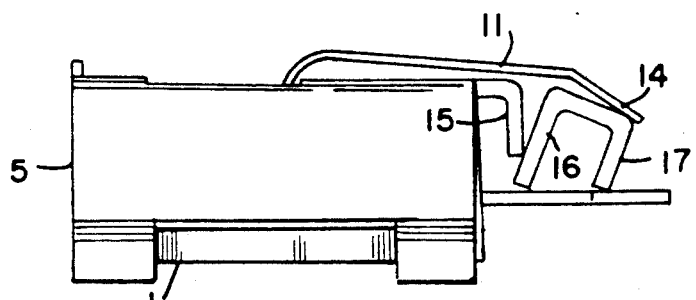
FIGS. 5 and 6 show different embodiments after the fusible pellet has melted.
Figure 6:
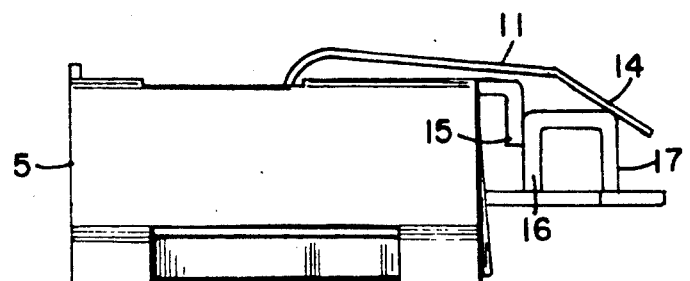

In operation, grounding terminal 3 and ground clamp 5 would be connected to ground. A surge voltage appearing at either terminal 2 or 4 would be shorted by BVSS 1 to grounding terminal 3. If the surge persisted, the current flow through grounding terminal 3 would heat fusible pellet 7 sufficiently to melt it which would result in spring arms 11 pushing shorting bar 6 down into contact with both terminals 2 and 4, thereby grounding terminals 2 and 4. Current could flow from terminals 2 or 4 to ground in any of several ways. For example, shorting bar 6 is in contact with forward edge 15 of ground clamp 5, which is one path. Another path is from shorting bar 6 to metal spring 8 to ground clamp 5. FIG. 5 shows another version. Shorting bar 6 is shaped so that rear portion 16 thereof rests on grounding terminal 3 with fusible pellet 7 in place. When fusible pellet 7 melts, shorting bar 6 rotates forward; then forward portions 17 of shorting bar 6 come into contact with terminals 2 and 4.

Examples of BVSS switches that may be used are Surgectors made by RCA Corporation or Sidactors made by Teccor Electronics, Inc.

I claim:

1. A telephone protector comprising:
   an encapsulated bidirectional voltage sensitive switch (BVSS) having three terminals protruding therefrom, one of the terminals being a grounding terminal;
   an elongated shorting bar substantially orthogonal to the three terminals;
   a metal fusible pellet in direct physical contact with both the grounding terminal and the shorting bar, the metal fusible pellet acting as a spacer to keep the shorting bar spaced from the other two terminals;
   spring means to impel the shorting bar into direct physical contact with said other two terminals when the metal fusible pellet has melted.

2. The telephone protector of claim 1 wherein the BVSS is contained within a grounding clamp.

3. The telephone protector of claim 2 wherein the spring means is secured between the BVSS and the grounding clamp.

4. The telephone protector of claim 3 wherein the spring means has two arms, the arms pressing down on opposite ends of the shorting bar.

* * * * *